April 3, 1934.   C. F. RAUEN ET AL   1,953,264
MUFFLER FOR INTERNAL COMBUSTION ENGINES AND THE LIKE
Filed Feb. 6, 1928   3 Sheets-Sheet 1
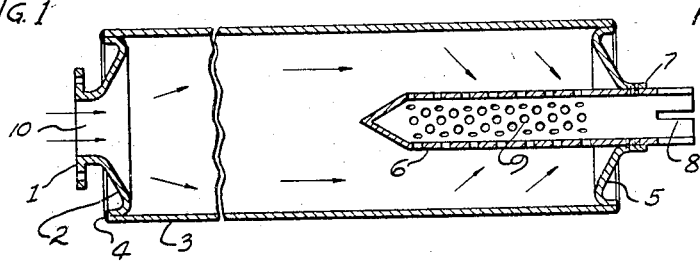
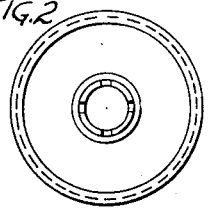
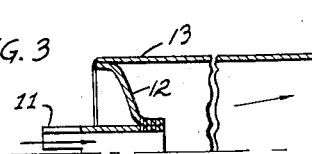
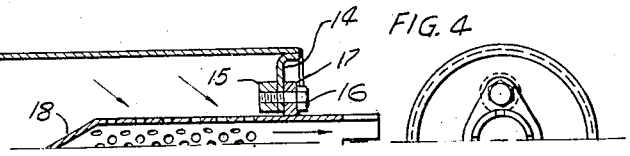
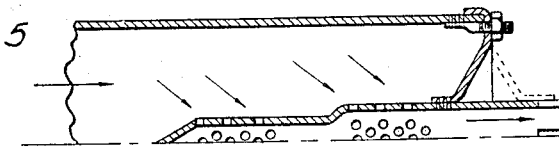
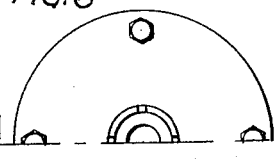
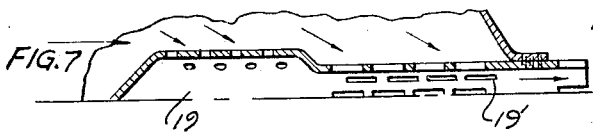
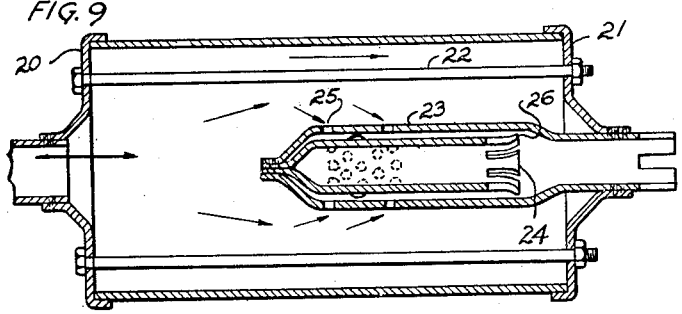
INVENTORS
CARL F. RAUEN
JOHN T. RAUEN
BY Robert H. Young
ATTORNEY April 3, 1934.   C. F. RAUEN ET AL   1,953,264
MUFFLER FOR INTERNAL COMBUSTION ENGINES AND THE LIKE
Filed Feb. 6, 1928   3 Sheets-Sheet 2
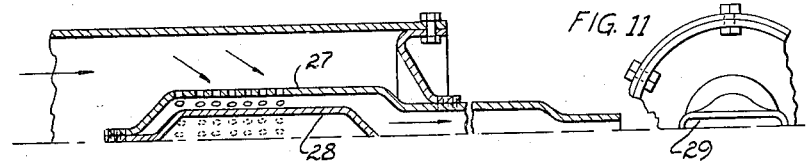
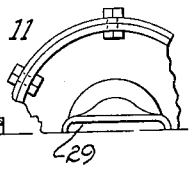
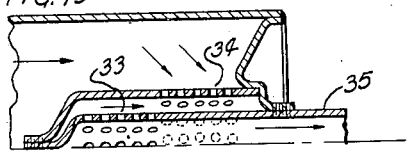
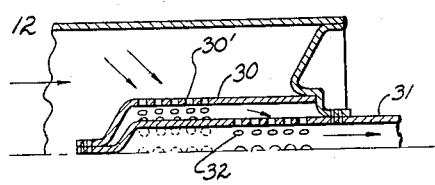
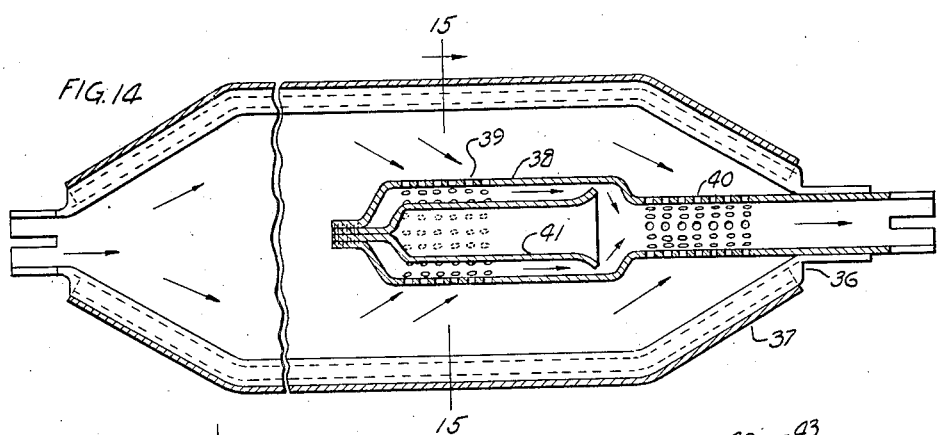
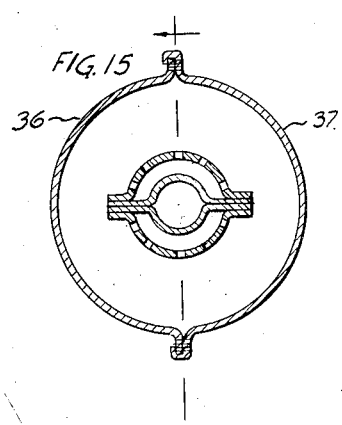
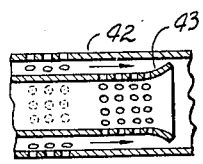
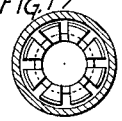
INVENTORS
CARL F. RAUEN
JOHN T. RAUEN
BY Robert H. Grung
ATTORNEY

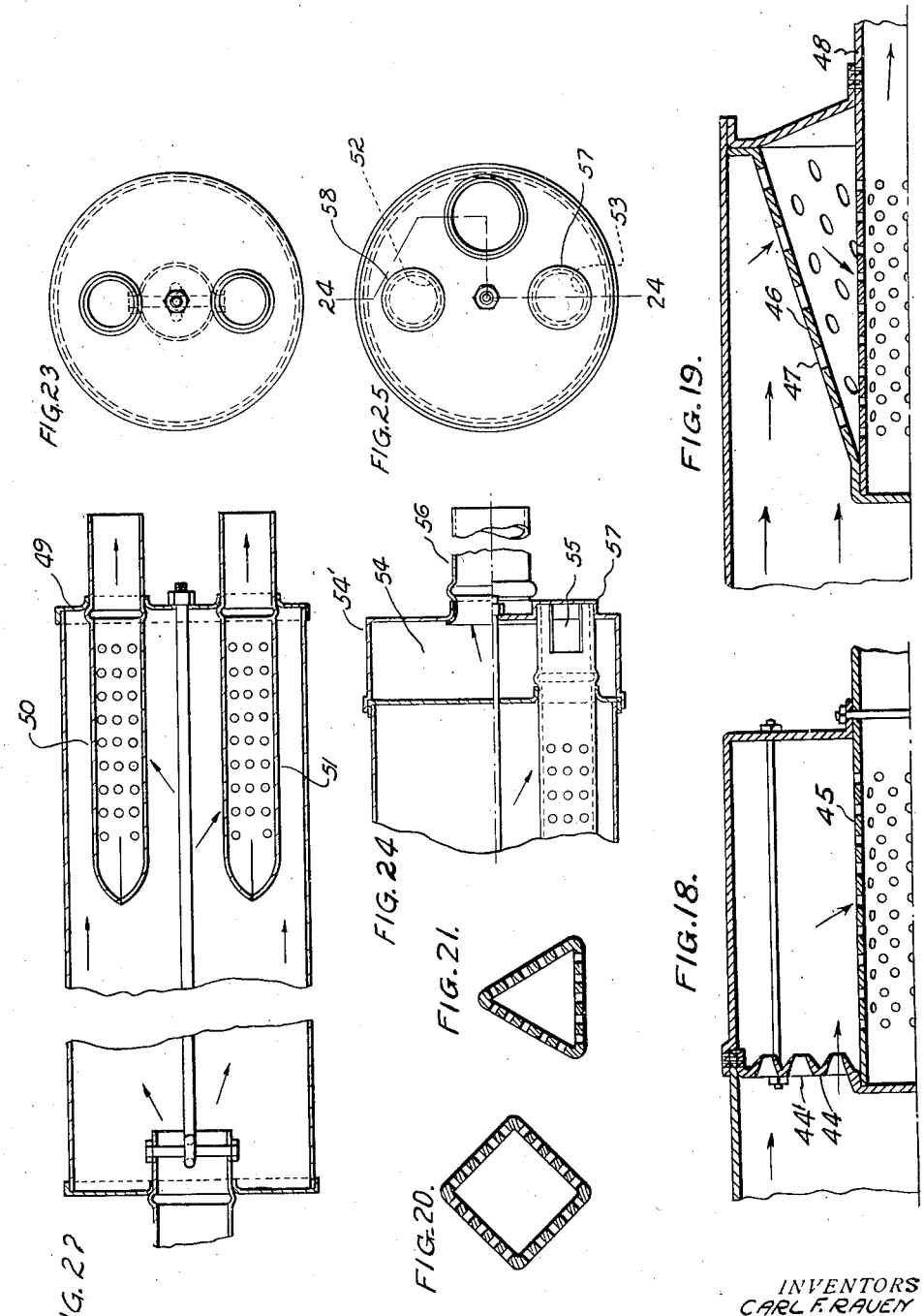

Patented Apr. 3, 1934

1,953,264

UNITED STATES PATENT OFFICE 1,953,264

MUFFLER FOR INTERNAL COMBUSTION ENGINES AND THE LIKE

Carl F. Rauen and John T. Rauen, Dayton, Ohio; said John T. Rauen assignor to said Carl F. Rauen Application February 6, 1928, Serial No. 252,256

3 Claims. (Cl. 137—160)

This invention relates to mufflers for internal combustion engines and the like. The primary object of this invention is to provide a muffler which will give a maximum silencing of the exhaust, with a minimum of back pressure, and the muffler is so constructed that the exhaust gases will have unrestricted expansion within said muffler to reduce back pressure, said expanded gases being then divided into interfering streams, before passing to the atmosphere whereby a silencing effect is obtained.

A further object of this invention is to provide a muffler that is efficient, simple in construction and cheap to manufacture. With these and other objects in view as will hereinafter appear, our invention consists of certain novel features of construction, combination and arrangement of parts as will be hereinafter described in detail and particularly set forth in the appended claims, reference being had to the accompanying drawings which form a part of this specification.

Fig. 1 shows a longitudinal sectional view of this invention.

Fig. 2 is an end view looking from the right of Fig. 1.

Figs. 3, 5, 7 and 10 are sectional longitudinal views of modifications of this invention.

Figs. 4, 6, 8 and 11 are end views of Figs. 3, 5, 7 and 10 respectively.

Figs. 9, 12, 13, 14, 18 and 19 are still further modifications of our invention shown in section.

Fig. 15 is a cross section taken on line 15—15 of Fig. 14.

Figs. 16 and 17 are longitudinal and end views respectively of a modification of the silencer in Fig. 14.

Figs. 20 and 21 are sectional views of further modifications of the silencing tube of our invention.

Figs. 22 and 23 are sectional and end views of a further modification of our invention in which two silencing tubes are used.

Fig. 24 is a modification of Fig. 22 and taken on the line 24—24 of Fig. 25, showing a common exhaust port provided for the silencing tubes.

Fig. 25 is an end view of Fig. 24.

Similar reference characters refer to similar parts throughout the several views of the drawings. The device as shown in Fig. 1 is provided with a flange 1 for attachment of the muffler to the exhaust pipe of an internal combustion engine. This flange is preferably welded to the head 2, which in turn is placed in the cylinder 3 and welded to it at 4. A similar head 5 is welded in the outlet end of the cylinder and carries the perforated tube 6 which in turn is welded in the head 5 at 7.

The perforated tube 6 is closed at one end and the other end is slotted at 8 to provide for clamping a pipe in said perforated tube to conduct the gases from the muffler if desired. The clamp fits around the outer part of the slotted portion. The tube 6 can be made any shape desired and in one or more pieces. In fact, it can be punched out of flat stock and rolled to shape. It is further understood that the several parts may be joined together by welding as shown in Fig. 1 by bolts and nuts as shown and described hereinbelow, or any other well-known means. The perforations 9 are shown round, but may be any shape desired, or can be small slots.

The exhaust gases from the engine enter the muffler at 10, whereupon they immediately expand. Said expansion is not in any way hindered by baffles, etc. which cause a great deal of back pressure, with consequent loss of power and overheating of the engine. The gases after expanding and losing heat and consequently volume enter the tube or silencer 6 thru the perforations 9 and thence to atmosphere. By silencing the gases after expansion and cooling, the volume of gas to be handled is considerably less and therefore in the case of motor vehicles it is desirable to place the muffler as far to the rear of the car as practical to gain all possible expansion.

Fig. 3 shows a different construction. The exhaust pipe from the engine is clamped inside the slotted pipe 11, said slotted pipe being fastened to the head 12 by welding or other means. The head 12 is shown welded to the cylinder 13. The head 14 at the other end is also welded in the cylinder 13 and has lugs 15 welded to it to provide stock for the thread which receives the cap screw 16. A flange 17 is welded to the perforated tube 18 and is secured to the head 14 by the screws 16. This feature of being able to remove the tube silencer 18 permits the cleaning of same and removal of carbon deposits if necessary.

Fig. 5 shows another form of detachable silencer. This silencer is shown in two diameters to give better breaking of the sound waves.

Fig. 7 shows a silencer of two diameters and provided with round holes 19 and rectangular slots 19'. The slots 19' can be made of any desired shape.

Fig. 9 shows a muffler with the heads 20 and 21 detachable and held together by thru bolts 22. The silencer in this design consists of two tubes 23 and 24, one inside the other and closed at one end. The tube 23 is provided with perforations 25 and the tube 24 is provided with orifices at the open end. The end of the tube 24 is bell mouthed to prevent ringing, due to the gas impinging on it after entering the holes 25. This bell mouth further silences the gases by means of the small annular passage 26 between it and the tube 23. Fig. 10 shows another form of detachable silencer, which consists of two tubes 27 and 28. The tube 27 is perforated and closed at one end. The tube 28 is not perforated, but has its ends closed to prevent ringing. The tube 27 is flattened on the end as shown at 29 in Fig. 11.

Fig. 12 shows another form of silencer. The gas enters the tube 30 thru the holes 30' and thence into the tube 31 thru the holes 32 and thence to atmosphere.

Fig. 13 is similar to Fig. 12, except that the gas reverses as shown by the arrow 33 before passing from the tube 34 into the tube 35.

Fig. 14 shows another form of muffler construction with a modification of the double tube silencer.

The outer shell or expansion chamber is made in two pieces—36 and 37, Fig. 15 and fastened together by any practical means, welding being shown. These parts are each stamped from one piece, which eliminates the need of heads. The silencer consists of an outer tube 38 of two diameters, with perforation at 39 and 40, and a bell mouthed inner tube 41, which may or may not be perforated as desired.

Fig. 16 is a modified form of the silencer shown in Fig. 14. The tube 42 corresponds to tube 38 of Fig. 14 and the tube 43 corresponds to tube 41 of Fig. 14. The tube 43 however is shown having a plurality of perforations intermediate of its ends and preferably in proximity to the bell mouthed opening thereof to break up the sound waves.

Fig. 18 shows a baffle plate 44 in the rear part of the expansion chamber with holes 44' in it that are of a truncated cone shape. These holes are larger than the holes in the silencer 45, to divide the gas into small streams before it enters the tube 45, from which it passes to atmosphere.

Fig. 19 shows a conical baffle plate 46 with holes 47 which are larger than the holes in the silencer 48 and which can be as shown, or as the holes 44' in Fig. 18. This cone 46 reduces the available expansion space but very little and breaks up the sound waves before the gas enters the tube 48.

Figs. 20 and 21 show sections thru a square and triangular shaped silencer.

Fig. 22 shows a detachable head muffler, the rear head 49 carries two perforated silencers 50 and 51.

Fig. 24 shows a modification of Fig. 22 the perforated tubes 52 and 53 being off center and the gas after entering them passes into the common chamber 54 thru the slots 55 before passing to atmosphere thru the pipe 56, supported by the cup 54'. Perforations similar to those on the inner end can be used instead of the slots 55. Extrusions 57 and 58 in the cup 54' are supports for tubes 52 and 53.

We claim:

1. In a muffler of the class described, a silencer comprising inner and outer tubular members disposed within said muffler, one of said members being perforated and having its inner end closed and outer end open to atmosphere, the other of said members having its inner end closed also and its outer end flared outwardly toward the outer member whereby a restriction is formed between the inner and outer members for dampening the sound waves of the expanded gases.

2. In a muffler of the class described, a silencer comprising inner and outer tubular members disposed within said muffler, one of said members being provided with openings and having its inner end closed and outer end open to atmosphere, the other of said members having its inner end closed also and its outer end flared outwardly toward the outer member whereby a restriction is formed between the inner and outer members for dampening the sound waves of the expanded gases, said flared end being provided with a plurality of openings.

3. A muffler having an expansion chamber provided with an inlet port, a silencer partially disposed within said chamber and having one end closed and the other end open to atmosphere to provide an exhaust port, said silencer comprising a plurality of tubular portions of different internal cross-sectional areas one disposed within the other and spaced from one another along a substantial part of their length, and having their corresponding inner ends closed and outer ends open to the atmosphere, the inner tubular portion having its open end leading into said other portion, and said tubular portions being provided with openings for the passage of exhaust gases.

CARL F. RAUEN.
JOHN T. RAUEN.